US012790549B2

(12) United States Patent
Li et al.

(10) Patent No.: US 12,790,549 B2
(45) Date of Patent: Nov. 10, 2026

(54) CATALYST COAL-OIL SLURRY AND PREPARATION METHOD THEREFOR, DIRECT COAL LIQUEFACTION METHOD, AND USE

(71) Applicants: CHINA SHENHUA COAL TO LIQUID AND CHEMICAL CO., LTD, Beijing (CN); CHINA SHENHUA COAL TO LIQUID AND CHEMICAL SHANGHAI RESEARCH INSTITUTE, Shanghai (CN)

(72) Inventors: Dao Li, Shanghai (CN); Geping Shu, Shanghai (CN); Geling Yang, Shanghai (CN); Shansong Gao, Shanghai (CN); Hongxue Wang, Shanghai (CN)

(73) Assignees: CHINA SHENHUA COAL TO LIQUID AND CHEMICAL CO., LTD, Beijing (CN); CHINA SHENHUA COAL TO LIQUID AND CHEMICAL SHANGHAI RESEARCH INSTITUTE, Beijing (CN)

( * ) Notice: Subject to any disclaimer, the term of this patent is extended or adjusted under 35 U.S.C. 154(b) by 178 days.

(21) Appl. No.: 18/847,927

(22) PCT Filed: Jan. 9, 2023

(86) PCT No.: PCT/CN2023/071350

§ 371 (c)(1),
(2) Date: Sep. 17, 2024

(87) PCT Pub. No.: WO2023/185208

PCT Pub. Date: Oct. 5, 2023

(65) Prior Publication Data

US 2025/0197730 A1 Jun. 19, 2025

(30) Foreign Application Priority Data

Mar. 31, 2022 (CN) ........................ 202210336303.5

(51) Int. Cl.
*C10G 1/08* (2006.01)
*B01J 27/051* (2006.01)
*B01J 37/04* (2006.01)
*B01J 37/20* (2006.01)

(52) U.S. Cl.
CPC ............ *C10G 1/086* (2013.01); *B01J 27/051* (2013.01); *B01J 37/04* (2013.01); *B01J 37/20* (2013.01); *C10G 1/083* (2013.01)

(58) Field of Classification Search
CPC ........ C10G 1/086; C10G 1/083; B01J 27/051; B01J 37/04; B01J 37/20; B01J 2231/62; B01J 2540/44; B01J 31/2213; B01J 31/226; B01J 35/27
See application file for complete search history.

(56) References Cited

U.S. PATENT DOCUMENTS

| | | | | |
|---|---|---|---|---|
| 4,251,346 A * | 2/1981 | Dry | C10G 1/065 208/422 |
| 4,298,454 A | 11/1981 | Aldridge et al. | |
| 4,424,110 A * | 1/1984 | Bearden, Jr. | C10G 1/086 208/417 |
| 4,541,914 A * | 9/1985 | Hirokoh | C10G 1/002 208/418 |
| 5,055,174 A | 10/1991 | Howell et al. | |
| 5,246,570 A | 9/1993 | Cronauer et al. | |
| 5,338,441 A | 8/1994 | LeViness et al. | |
| 2009/0314684 A1 | 12/2009 | Kuperman et al. | |
| 2011/0120914 A1* | 5/2011 | Kuperman | C10G 1/086 208/403 |
| 2013/0338411 A1* | 12/2013 | Sharma | C10G 1/002 44/281 |
| 2015/0191657 A1* | 7/2015 | Bauman | C10G 1/086 208/418 |
| 2025/0235856 A1* | 7/2025 | Li | B01J 31/2226 |

FOREIGN PATENT DOCUMENTS

| | | |
|---|---|---|
| CA | 1249536 A | 1/1989 |
| CN | 100381540 C | 4/2008 |
| CN | 104893751 A | 9/2015 |
| CN | 109423322 A | 3/2019 |
| CN | 114768833 A | 7/2022 |
| EA | 008269 B1 | 4/2007 |

(Continued)

OTHER PUBLICATIONS

PCT International Search Report and PCT Written Opinion of the International Searching Authority; PCT/CN2023/071350; Apr. 22, 2023; 10 pages.

(Continued)

*Primary Examiner* — Ellen M Mcavoy
(74) *Attorney, Agent, or Firm* — Conley Rose, P.C.; Brooks W Taylor

(57) ABSTRACT

The present disclosure relates to the field of direct coal liquefaction, and discloses a catalyst oil-coal slurry and preparation method thereof, a method for direct coal liquefaction, and uses. The method comprises: mixing an oil-soluble molybdenum source, a solvent, coal powder and an optional sulfur source to obtain the catalyst oil-coal slurry. The use of the catalyst oil-coal slurry for direct coal liquefaction can obtain a higher oil yield and reduce production costs.

16 Claims, No Drawings

(56) References Cited

FOREIGN PATENT DOCUMENTS

| | | | |
|---|---|---|---|
| EP | 1996679 | A1 | 12/2008 |
| JP | H06166876 | A | 6/1994 |
| RU | 2445343 | C1 | 3/2012 |

OTHER PUBLICATIONS

Wenzheng, Zhang; "Current Status of Research and Development for Coal Liquefaction"; China Molybdenum Industry; Jun. 2002; Vo. 26, No. 3; 4 pages.
Xu, Jianwen, et al.; "Advances in the Direct Coal Liquefaction"; Chemical Industry and Engineering Progress; vol. 31, No. S1; Jul. 15, 2012; 5 pages.
Russian Office Action; Application No. 2024128202/04(062719); Apr. 28, 2025; 9 pages.
Russian Office Action; Application No. 2024128202/04(062719); Sep. 18, 2025; 9 pages.
Australian Examination Report; Application No. 2023247381; Aug. 11, 2025; 3 pages.
German Office Action; Application No. 112023001767.0; Oct. 24, 2025; 10 pages.
Japanese Office Action; Application No. 2024-556817; Oct. 28, 2025; 14 pages.

* cited by examiner

CATALYST COAL-OIL SLURRY AND PREPARATION METHOD THEREFOR, DIRECT COAL LIQUEFACTION METHOD, AND USE

CROSS-REFERENCE TO RELATED APPLICATIONS

This application is a U.S. National Stage of International Patent Application No. PCT/CN2023/071350 filed Jan. 9, 2023, which claims priority to Chinese Patent Application No. 202210336303.5 filed Mar. 31, 2022, both of which are incorporated by reference herein as if reproduced in their entireties.

TECHNICAL FIELD

The present disclosure relates to the technical field of direct coal liquefaction, and specifically to a catalyst oil-coal slurry and preparation method thereof, a method for direct coal liquefaction, and uses.

BACKGROUND

Direct coal liquefaction is a clean coal technology that converts coal into liquid products by allowing hydrogen to enter the molecular structure of coal and its derivatives under high temperature and high pressure conditions with the aid of hydrogen-donor solvents and catalysts. At the beginning of the development of direct liquefaction, the reaction conditions of coal liquefaction at that time were quite harsh, and the reaction pressure was as high as 70 MPa, because the two key influencing factors of coal liquefaction catalyst and solvent pre-hydrogenation were not found to promote coal liquefaction. Since the development of direct coal liquefaction for more than 100 years, researches in various countries have begun to pay attention to the use of catalysts and solvent hydrogenation technology, thus the reaction conditions tend to ease. However, the current direct coal liquefaction technology still faces the problems of low oil yield and high production cost caused by low oil yield. Therefore, it is urgent to develop a direct coal liquefaction technology that can significantly improve the oil yield.

SUMMARY

The purpose of the present disclosure is to overcome the above-mentioned problems existing in the prior art, provide a catalyst oil-coal slurry and a preparation method thereof, and a method for direct coal liquefaction, and uses. The use of the catalyst oil-coal slurry for direct coal liquefaction can obtain a higher oil yield and reduce production costs.

In order to achieve the above-mentioned purpose, the first aspect of the present disclosure provides a method for preparing a catalyst oil-coal slurry, the method comprises: mixing an oil-soluble molybdenum source, a solvent, coal powder and an optional sulfur source to obtain the catalyst oil-coal slurry.

The second aspect of the present disclosure provides a catalyst oil-coal slurry, the catalyst oil-coal slurry comprises an oil-soluble molybdenum source, a solvent, coal powder and an optional sulfur source;

Or, the catalyst oil-coal slurry is prepared by the method described in the first aspect.

In the third aspect, the present disclosure provides a method for direct coal liquefaction, the method comprises:

subjecting the catalyst oil-coal slurry described in the second aspect to direct coal liquefaction;

Or, subjecting coal powder to direct coal liquefaction in the presence of a solvent, an oil-soluble molybdenum source and an optional sulfur source.

In the fourth aspect, the present disclosure provides the use of the catalyst oil-coal slurry described in the second aspect or the method described in the first aspect in direct coal liquefaction.

Through the above technical solution, the present disclosure can achieve the following beneficial effects:

1. Compared with the prior art, in the catalyst oil-coal slurry provided by the present disclosure, the catalyst is highly dispersed therein, has better dispersibility under liquefaction conditions, and is highly loaded on coal powder; after being converted into molybdenum disulfide, it has a higher activity, can better catalyze the reaction, and can effectively prevent the agglomeration of macromolecules during the reaction.
2. Compared with the existing iron-based catalyst, under the same liquefaction conditions, by using the catalyst oil-coal slurry provided by the present disclosure for direct coal liquefaction, the oil yield can be increased by about 10 percentage points, and the conversion rate is also significantly improved, thereby reducing the production cost.
3. In particular, when the oil-soluble molybdenum source is molybdenum dialkyl dithiophosphate and molybdenum dialkyl dithiocarbamate, the above two substances are commonly used lubricating oil additives, which are cheap and do not require additional sulfur sources, the complexity of operation is reduced and the production cost can be further reduced. In addition, when the oil-soluble molybdenum source is molybdenum dialkyl dithiocarbamate, the use of phosphorus is avoided, thus further reducing the pollution to the environment, and the chemical stability is better, which is more conducive to the direct liquefaction reaction.

DETAILED DESCRIPTION

The endpoints of the ranges and any values disclosed herein are not limited to the precise ranges or values, which should be understood to include values approximating these ranges or values. For ranges of values, the endpoints of each range, the endpoints of each range and the individual point values, and the individual point values can be combined with each other to yield one or more new ranges of values, and these ranges of values should be considered to be specifically disclosed herein.

In a first aspect, the present disclosure provides a method for preparing a catalyst oil-coal slurry, the method comprises: mixing an oil-soluble molybdenum source, a solvent, coal powder and an optional sulfur source to obtain the catalyst oil-coal slurry.

The current direct coal liquefaction technology still faces the problems of low oil yield and high production cost.

The inventors of the present disclosure have found in study that the use of the above-mentioned method to prepare the catalyst oil-coal slurry, especially the use of the above-mentioned oil-soluble molybdenum source as a catalyst, not only avoids the problems of large water consumption and complicated preparation process of the traditional water-soluble highly dispersed catalyst in the preparation, but also avoids the problems of large particle size and poor dispersibility of the powder inorganic catalyst. The oil-soluble molybdenum source is highly dispersed in the catalyst oil-coal slurry and highly loaded on the coal powder, and it is converted into an ultra-fine catalyst molybdenum disulfide under liquefaction conditions, which has better activity, can exert a higher hydrogenation catalytic activity, thus higher oil yield and conversion rate can be obtained, and the agglomeration of macromolecules can be effectively prevented during the reaction. In addition, it can be determined whether to add a sulfur source according to the specific oil-soluble molybdenum source used. Furthermore, the inventors of the present disclosure also found that the use of the catalyst oil-coal slurry as described above can obtain a significantly higher oil yield under the same liquefaction conditions relative to the catalyst oil-coal slurry using an iron-based catalyst.

According to the present disclosure, preferably, relative to 100 parts by weight of coal powder, the amount of the oil-soluble molybdenum source based on molybdenum element is 0.005-1 parts by weight, preferably 0.1-0.3 parts by weight, and more preferably 0.2-0.25 parts by weight. The inventors of the present disclosure found in their study that when the above ranges are met, significantly higher catalytic effects can be obtained, and higher oil yield and conversion rate can be obtained.

According to the present disclosure, preferably, the oil-soluble molybdenum source is selected from at least one of molybdenum phosphate, molybdenum hexacarbonyl, molybdenum naphthenate, molybdenum carboxylate, molybdenum sulfonate, molybdenum hydroxythiol and molybdenum xanthate. More preferably, the oil-soluble molybdenum source is at least one of molybdenum dialkyl dithiophosphate (a molybdenum phosphate), molybdenum dialkyl dithiocarbamate (a molybdenum carboxylate), molybdenum hexacarbonyl and molybdenum naphthenate, more preferably at least one of molybdenum dialkyl dithiophosphate (MoDTP) and molybdenum dialkyl dithiocarbamate (MoDTC).

It can be understood that naphthenic acid is a mixture of organic acids in the form of dark oil separated from petroleum products during refining, and the corresponding prepared molybdenum naphthenate is also a mixture, and molybdenum naphthenate is mainly a carboxyl derivative of five-membered carbon rings. In addition, in molybdenum dialkyl dithiocarbamate, different lengths of the alkyl carbon chains correspond to different specific substances, and the same is true for molybdenum dialkyl dithiophosphate, that is, in molybdenum dialkyl dithiophosphate, the different lengths of the alkyl carbon chains correspond to different specific substances. For molybdenum dialkyl dithiocarbamate, when the alkyl carbon chain has fewer carbon atoms, for example, 2-6, such as 3, 4 or 5, the substance is generally in powder (solid) form; when the alkyl carbon chain has a large number of carbon atoms, for example, 12-14, the substance is generally in oil (liquid) form. Molybdenum dialkyl dithiophosphate is generally in oil (liquid) form. Liquid molybdenum dialkyl dithiocarbamate is further preferred.

The inventors of the present disclosure have found in study that the use of the oil-soluble molybdenum source as described above can achieve a better catalytic effect and can obtain a higher oil yield. In particular, molybdenum dialkyl dithiophosphate or molybdenum dialkyl dithiocarbamate is a component commonly used in lubricating oil, which is cheap, can reduce production costs, and can also directly decompose to form $MoS_2$ which has direct catalytic effects under liquefaction conditions, without the need to add additional sulfur for sulfuration, making production operations simpler and more cost-effective. The inventors of the present disclosure further found in their study that when liquid molybdenum dialkyl dithiocarbamate is used, not only a better dispersion effect and a higher oil yield can be obtained, but also the use of phosphorus can be avoided, further reducing the influence on the environment.

According to the present disclosure, preferably, relative to 100 parts by weight of coal powder, the amount of the solvent is 80-220 parts by weight, preferably 100-190 parts by weight, and more preferably 120-150 parts by weight.

According to the present disclosure, preferably, the solvent is a hydrogen-donor solvent, the hydrogen-donor solvent has a $\rho^{20}$ lower than 0.98 $g \cdot cm^{-3}$, a kinematic viscosity at 40° C. that is lower than 5 $mm^2/s$, and a molar ratio of H to C that is higher than 0.25. The hydrogen-donor solvent refers to a solvent that can dissolve coal (that is, make coal swells and then form a uniform oil-coal slurry with the hydrogen-donor solvent) during the coal liquefaction process, diffuse hydrogen to the surface of the coal or catalyst to provide and transfer hydrogen, and the solvent also has the effect of preventing the polycondensation of free radical fragment from thermal decomposition of coal.

The hydrogen-donor solvent may include one or more of tetrahydronaphthalene, dihydrophenanthrene and dihydroanthracene. In direct coal liquefaction, the hydrogen-donor solvent used may generally be a self-produced circulating solvent of direct coal liquefaction, for example, the partial liquefaction oil was used as a circulating solvent in CN104893751A. It can be understood that during the continuous operation of the direct coal liquefaction device, the mixed oil of medium oil and heavy oil produced by the direct coal liquefaction itself is called the self-produced circulating solvent of direct coal liquefaction. The use of such solvent can not only play the role of a hydrogen-donor solvent, but also further recycle materials to avoid waste. $\rho^{20}$ refers to the density measured at 20° C., and the kinematic viscosity is measured by the method in GB/T 265-1988; the molar ratio of H to C is a sign of the hydrogen content of the solvent, and the higher the ratio, the stronger the hydrogen donor capacity.

The use of the solvent as described above can further improve the dispersibility of the oil-soluble molybdenum source in the catalyst oil-coal slurry, and can further control the concentration of each material within a more appropriate range, thereby further improving the oil yield.

According to the present disclosure, the sulfur source is a sulfur-containing substance that can convert the oil-soluble molybdenum source into a sulfur-containing substance such as molybdenum disulfide. Therefore, when the oil-soluble molybdenum source itself contains sulfur and can be converted into molybdenum disulfide (especially under direct coal liquefaction conditions), there is no need to introduce a sulfur source additionally. Preferably, the amount of the sulfur source is such that the molar ratio of sulfur element to molybdenum element in the catalyst oil-coal slurry is 0-3.5, preferably 2-2.8, and more preferably 2.2-2.5. It can be understood that the oil-soluble molybdenum source may also contain sulfur element, and the amount of the sulfur source is based on the principle that the molar ratio of the total amount of sulfur element to molybdenum element in the catalyst oil-coal slurry meets the above molar ratio.

According to the present disclosure, preferably, the sulfur source is selected from at least one of elemental sulfur, inorganic sulfur and organic sulfur, preferably at least one of sulfur, carbon disulfide, sodium sulfide and sodium hydrosulfide.

Wherein, the mixing order of the oil-soluble molybdenum source, the solvent, the coal powder and the optional sulfur source is not particularly limited, as long as the oil-soluble molybdenum source can be as dispersed as possible and the material can be as evenly as possible. However, preferably, the method comprises: mixing the oil-soluble molybdenum source and the solvent first, then mixing with the coal powder, and adding or not adding the sulfur source to obtain the catalyst oil-coal slurry. The inventors of the present disclosure have found in their study that mixing the oil-soluble molybdenum source and the solvent first can make the oil-soluble molybdenum source more evenly dispersed in the catalyst oil-coal slurry, thereby obtaining a higher oil yield.

In the present disclosure, there is no particular limitation on the coal powder, which can be coal from various sources. The inventors of the present disclosure have found that the method of the present disclosure can achieve good conversion effects for coal powder with a low vitrinite content, such as coal with a vitrinite content of 40-48% by weight, such as 42% by weight, 44% by weight or 46% by weight. It can be understood that coal generally includes vitrinite, inertinite and exinite. The vitrinite has a high oxygen content, a low carbon content and a medium hydrogen content. During hydrogenation liquefaction, the vitrinite is easier to liquefy than the other two, thus the vitrinite content can generally characterize the difficulty of coal liquefaction. In general, the higher the vitrinite content in the coal powder, the easier it is to liquefy. In the prior art, it is generally desired to use coal powder with a higher vitrinite content. The method of the present disclosure can achieve good conversion effects not only for coal powder with a higher vitrinite content, but also for coal powder with a lower vitrinite content (such as a vitrinite content of 40-48% by weight) which is difficult to convert in the prior art.

In a second aspect, the present disclosure provides a catalyst oil-coal slurry, the catalyst oil-coal slurry comprises an oil-soluble molybdenum source, a solvent, coal powder and an optional sulfur source;

Or, the catalyst oil-coal slurry is prepared by the method described in the first aspect. In this aspect, the amount and type of each raw material are as described above and will not be repeated here.

In a third aspect, the present disclosure provides a method for direct coal liquefaction, the method comprises: subjecting the catalyst oil-coal slurry described in the second aspect to direct coal liquefaction;

Or, subjecting coal powder to direct coal liquefaction in the presence of a solvent, an oil-soluble molybdenum source and an optional sulfur source. In this aspect, the amount and type of each raw material are as described above and will not be repeated here.

According to the present disclosure, when performing direct coal liquefaction, the direct coal liquefaction conditions can adopt the direct coal liquefaction conditions commonly used in the art, such as the direct coal liquefaction conditions disclosed in CN104893751A and CN100381540C. In an embodiment, the conditions for the direct coal liquefaction includes: a pressure of 18-22 MPa, such as a pressure of 20 MPa, a temperature of 435-475° C., such as a temperature of 450° C. or 460° C., and a reaction time of 0.5-1.5 h, such as a reaction time of 1 h. Direct coal liquefaction is generally carried out in the presence of hydrogen, and the amount of hydrogen makes the pressure within the above ranges.

In a fourth aspect, the present disclosure provides the use of the catalyst oil-coal slurry described in the second aspect or the method described in the first aspect in direct coal liquefaction.

According to a particularly preferred embodiment of the present disclosure, a catalyst oil-coal slurry is prepared and direct coal liquefaction is carried out according to the following method:

Fully mixing the liquid molybdenum dialkyl dithiocarbamate with a solvent and stirring them evenly, and then adding coal powder into the mixture, and adding sulfur, fully mixing and stirring them evenly to obtain a catalyst oil-coal slurry. Wherein, relative to 100 parts by weight of coal powder, the amount of the oil-soluble molybdenum source based on molybdenum element is 0.24-0.25 parts by weight, and the amount of the solvent is 125-140 parts by weight; the sulfur is added in such an amount that the molar ratio of sulfur to molybdenum in the catalyst oil-coal slurry is 2.25-2.35;

Adding the catalyst oil-coal slurry to a reactor, charging hydrogen, setting the reaction pressure to 19-20 MPa, the reaction temperature to 455-460° C., and the reaction time to 1-1.3 h.

The present disclosure will be described in detail by examples below. The coal powder in Examples 1-11 is Shendong coal, of which more than 80% has a particle size of less than 200 mesh.

TABLE 1

| Coal quality analysis of Shenhua coal | | | | | | | | | | | | | |
|---|---|---|---|---|---|---|---|---|---|---|---|---|---|
| Industrial analysis, w/% | | | | Element analysis, $w_{daf}$/% | | | | | n(H)/ | Petrographic analysis, φ/% | | |
| $M_{ad}$ | $A_d$ | $V_{daf}$ | $FC_{daf}$ | C | H | O | N | S | n(C) | Vitrinite | Inertinite | Exinite |
| 4.15 | 4.74 | 35.07 | 64.93 | 80.98 | 4.62 | 13.16 | 1.01 | 0.23 | 0.68 | 43.3 | 54.5 | 0.0 |

In Table 1, the meanings of the symbols are as follows:

Industrial analysis part: Mad refers to moisture content on air-dried basis; Ad refers to ash on dry basis; Vdaf refers to volatile matter on dry ash-free basis. Determined according to the methods in GB/T211-2017 and GB/T212-2008.

Element analysis part: $FC_{daf}$ refers to fixed carbon on dry ash-free basis; C, H, O, N, S refer to the content of each element respectively; determined according to the methods in GB/T214-2007, GB/T476-2008 and GB/T19227-2008.

Petrographic analysis part: Vitrinite refers to the vitrinite content; Inertinite refers to the inertinite content; Exinite refers to the exinite content. Determined according to the method in GB/T8899-2013.

The solvent in Example 1-11 was the self-produced circulating solvent of direct coal liquefaction, and the main properties of the solvent are shown in Table 2.

TABLE 2

| ρ20/ | Kinematic viscosity | H/ | w/% | | | | |
|---|---|---|---|---|---|---|---|
| (g · cm$^{-3}$) | (40 °C, mm$^2$/s) | C | C | H | O | N | S |
| 0.9503 | 3.22 | 1.48 | 88.86 | 10.98 | 0.12 | 0.04 | 0.003 |

Example 1

For illustrating the preparation method of the catalyst oil-coal slurry provided by the present disclosure.

Liquid molybdenum dialkyl dithiophosphate (molybdenum content of 10.45% by weight, the carbon atoms in the alkyl carbon chain was 13) and a solvent were fully mixed and stirred evenly, then coal powder was added to the mixture, and sulfur was added, then the mixture was fully mixed and stirred evenly to obtain a catalyst oil-coal slurry. Wherein, relative to 100 parts by weight of coal powder, the amount of oil-soluble molybdenum source based on molybdenum element was 0.22 parts by weight, and the amount of the solvent was 150 parts by weight; sulfur was added in such an amount that the molar ratio of sulfur element to molybdenum element in the catalyst oil-coal slurry was 2.2.

Example 2

For illustrating the preparation method of the catalyst oil-coal slurry provided by the present disclosure.

Liquid molybdenum dialkyl dithiocarbamate (molybdenum content of 10.45% by weight, the carbon atoms in the alkyl carbon chain was 13) and a solvent were fully mixed and stirred evenly, then coal powder was added to the mixture, and carbon disulfide was added, and the mixture was fully mixed and stirred evenly to obtain a catalyst oil-coal slurry. Wherein, relative to 100 parts by weight of coal powder, the amount of the oil-soluble molybdenum source based on molybdenum element was 0.2 parts by weight, and the amount of the solvent was 120 parts by weight; sulfur was added in such an amount that the molar ratio of sulfur element to molybdenum element in the catalyst oil-coal slurry was 2.5.

Example 3

For illustrating the preparation method of the catalyst oil-coal slurry provided by the present disclosure.

Liquid molybdenum dialkyl dithiocarbamate (molybdenum content of 9.86% by weight, the carbon atoms in the alkyl carbon chain was 13) and a solvent were fully mixed and stirred evenly, then coal powder was added to the mixture, and sulfur was added, and the mixture was fully mixed and stirred evenly to obtain a catalyst oil-coal slurry. Wherein, relative to 100 parts by weight of coal powder, the amount of the oil-soluble molybdenum source based on molybdenum element was 0.25 parts by weight, and the amount of the solvent was 130 parts by weight; sulfur was added in such an amount that the molar ratio of sulfur element to molybdenum element in the catalyst oil-coal slurry was 2.3.

Example 4

For illustrating the preparation method of the catalyst oil-coal slurry provided by the present disclosure.

The catalyst oil-coal slurry was prepared according to the method of Example 3, the difference was that no sulfur source was added.

Example 5

The catalyst oil-coal slurry was prepared according to the method of Example 3, the difference was that the liquid molybdenum dialkyl dithiocarbamate was replaced by molybdenum hexacarbonyl powder.

Example 6

The catalyst oil-coal slurry was prepared according to the method of Example 3, the difference was that the liquid molybdenum dialkyl dithiocarbamate was replaced by molybdenum naphthenate powder.

Example 7

The catalyst oil-coal slurry was prepared according to the method of Example 3, the differences were that relative to 100 parts by weight of coal powder, the amount of the oil-soluble molybdenum source based on molybdenum element was 0.1 parts by weight, and the amount of the solvent was 100 parts by weight; sulfur was added in such an amount that the molar ratio of sulfur element to molybdenum element in the catalyst oil-coal slurry was 2.

Example 8

The catalyst oil-coal slurry was prepared according to the method of Example 3, the differences were that relative to 100 parts by weight of coal powder, the amount of the oil-soluble molybdenum source based on molybdenum element was 0.3 parts by weight, and the amount of the solvent was 190 parts by weight; sulfur was added in such an amount that the molar ratio of sulfur element to molybdenum element in the catalyst oil-coal slurry was 2.8.

Example 9

The catalyst oil-coal slurry was prepared according to the method of Example 3, the difference was that the liquid molybdenum dialkyl dithiocarbamate was replaced by molybdenum dialkyl dithiocarbamate powder (the carbon atoms in the alkyl carbon chain was 4).

Example 10

The catalyst oil-coal slurry was prepared according to the method of Example 3, the difference was that the liquid molybdenum dialkyl dithiocarbamate, the solvent, coal powder, and sulfur were mixed simultaneously.

Example 11

The catalyst oil-coal slurry was prepared according to the method of Example 3, the difference was that the liquid molybdenum dialkyl dithiocarbamate was replaced by molybdenum butyrate powder.

Example 12

The catalyst oil-coal slurry was prepared according to the method of Example 3, the difference was that the solvent was replaced by tetrahydronaphthalene (whose $\rho^{20}$ was 0.9659 g·cm$^{-3}$, the kinematic viscosity at 40° C. was 1.8 mm$^2$/s, and the molar ratio of H to C was 1.2).

Comparative Example 1

In accordance with the method in Example 3, the difference was that the liquid molybdenum dialkyl dithiocarbamate was replaced by molybdenum trioxide powder (non-oil soluble). The results are shown in Table 1.

Comparative Example 2

In accordance with the method in Example 3, the difference was that the liquid molybdenum dialkyl dithiocarbamate was replaced by molybdenum disulfide powder (non-oil soluble). The results are shown in Table 1.

Comparative Example 3

In accordance with the method in Example 3, the difference was that the liquid molybdenum dialkyl dithiocarbamate was replaced by ammonium heptamolybdate powder (non-oil soluble). The results are shown in Table 1.

Comparative Example 4

4.67 g of iron-based catalyst (including 3.97 g of coal powder) was fully mixed with 24.03 g of coal powder, 42 g of a solvent and 0.32 g of sulfur and stirred evenly to obtain an iron-based catalyst oil-coal slurry. That is, relative to 100 parts by weight of coal powder, the amount of iron element was 1 part by weight, and the amount of the solvent was 150 parts by weight;

Wherein, the preparation method of the iron-based catalyst was that: the raw coal was Shendong coal, and more than 80% of which has a particle size less than 200 mesh, the solvent oil was the self-produced circulating solvent oil of direct coal liquefaction, and the precipitant was aqueous ammonia. 49.64 g of $FeSO_4 \cdot 7H_2O$ crystals was dissolved with 446.44 g of deionized water at room temperature to prepare a certain aqueous solution, the solution was fully dissolved and stirred evenly, 158.864 g of coal powder was added to the solution, and stirred thoroughly to obtain a water-coal slurry with a coal powder concentration of about 24.12%; 24.272 g of commercially available aqueous ammonia with a concentration of 26% by weight was added to 330.58 g of deionized water to dilute to a dilute aqueous ammonia with a concentration of about 1.71%. The water-coal slurry and the above dilute aqueous ammonia were subjected to a neutralization reaction with co-flow and precipitation to generate an amorphous precipitate of divalent iron, which was evenly loaded on the coal powder. The air flow rate was set to 1.456 L/min and the ventilation time was set to 1 h; while inletting oxygen, aqueous ammonia was continuously added dropwise thereto to ensure that the process pH value was 7-7.5. After that, the slurry was centrifuged by a centrifuge, and the filter cake was placed in a blast drying oven at 40° C. and dried overnight; the obtained catalyst was ground to less than 200 mesh for later use. The iron content in the catalyst was 6% by weight.

Test Example 1

The same amount of catalyst oil-coal slurries prepared in Examples 1-11 and Comparative Examples 1-4 were taken, and direct coal liquefaction was carried out according to the following method:

The catalyst oil-coal slurry was added to a reactor, hydrogen was charged, the reaction pressure was set to 19 MPa, the reaction temperature was set to 455° C., and the reaction time was set to 1 h.

After the reaction was completed, a gas phase product and a liquid-solid phase product were obtained. The composition of the gas phase product was determined by gas chromatography. The liquid-solid phase product was subjected to Soxhlet extraction with n-hexane and tetrahydrofuran in turn, the n-hexane soluble matter was defined as oil, and the tetrahydrofuran soluble matter was defined as asphaltene and pre-asphaltene. The residue of the tetrahydrofuran insoluble matter after drying and then calcining at 815° C. in a muffle furnace for 6 h was defined as residual ash (RA). The coal conversion rate (X), gas yield (G), hydrogen consumption (H), oil yield (O) and asphaltene (including pre-asphaltene and asphaltene, A) yield were calculated according to the following formulas:

$$X = 1 - (TI - RA)/F_{daf};$$

$$A = (HI - TI)/F_{daf};$$

$$H = (H_0 - H_1)/F_{daf};$$

$$G = (G_1 - H_1)/F_{daf};$$

$$O = X + H - G - W - A;$$

Wherein, $F_{daf}$: coal mass on water-free and ash-free basis, g;

$H_0$: mass of hydrogen filled into the reactor before reaction, g;

$H_1$: mass of hydrogen remaining in the reactor after reaction, g;

$G_1$: mass of gas in the reactor after reaction, g;

HI: mass of n-hexane insoluble matter, g;

TI: mass of tetrahydrofuran insoluble matter, g;

RA: mass of residue of tetrahydrofuran insoluble matter after calcination, g;

H: hydrogen consumption;

G: gas yield;

W: water yield, the mass of water calculated by subtracting the oxygen element contained in gas products CO and $CO_2$ from the oxygen element in coal/$F_{daf}$, A: asphaltene yield, the difference between the mass of n-hexane insoluble matter and the mass of tetrahydrofuran insoluble matter/$F_{daf}$ and O: oil yield.

The coal conversion rate and oil yield are shown in Table 3.

TABLE 3

| | Coal conversion rate (%) | Oil yield (%) |
|---|---|---|
| Example 1 | 87.54 | 64.23 |
| Example 2 | 87.21 | 63.81 |
| Example 3 | 88.66 | 64.93 |
| Example 4 | 85.31 | 62.19 |
| Example 5 | 83.52 | 60.48 |
| Example 6 | 83.06 | 59.27 |
| Example 7 | 82.86 | 58.79 |
| Example 8 | 84.15 | 60.83 |
| Example 9 | 83.13 | 59.57 |
| Example 10 | 84.61 | 61.32 |
| Example 11 | 82.59 | 59.16 |
| Example 12 | 88.51 | 63.92 |
| Comparative Example 1 | 81.37 | 54.43 |

TABLE 3-continued

| | Coal conversion rate (%) | Oil yield (%) |
|---|---|---|
| Comparative Example 2 | 81.18 | 54.53 |
| Comparative Example 3 | 81.68 | 53.62 |
| Comparative Example 4 | 82.82 | 55.73 |

From the results in Table 3, it can be seen that using Examples 1-12 of the present disclosure can obtain a higher conversion rate and a higher oil yield, and the oil yield can be increased by about ten percentage points relative to Comparative Examples 1-4. Furthermore, the molybdenum dialkyl dithiocarbamate and molybdenum dialkyl dithiophosphate used in Examples 1-4 are cheap and can further reduce production costs.

Furthermore, the Shendong coal used above has a low vitrinite content and is a type of coal that is difficult to liquefy. By using the technical solution of the present disclosure, a better conversion effect can be achieved for Shendong coal which is difficult to liquefy, and when applied to other types of coal with a higher vitrinite and easier to liquefy, a better conversion effect can be achieved.

The preferred embodiments of the present disclosure have been described above in detail; however, the present disclosure is not limited thereto. Within the scope of the technical concept of the present disclosure, a variety of simple modifications can be made to the technical solutions of the present disclosure, including combining various technical features in any other suitable manner. These simple modifications and combinations should also be regarded as the content disclosed in the present disclosure, and all belong to the protection scope of the present disclosure.

The invention claimed is:

1. A method for preparing a catalyst oil-coal slurry, characterized in that, the method comprises: mixing an oil-soluble molybdenum source, a solvent, coal powder and a sulfur source to obtain the catalyst oil-coal slurry;

wherein, the oil-soluble molybdenum source is liquid molybdenum dialkyl dithiocarbamate;

the amount of the sulfur source is such that the molar ratio of sulfur element to molybdenum element in the catalyst oil-coal slurry is 2.2-2.5.

2. The method according to claim 1, wherein, relative to 100 parts by weight of coal powder, the amount of the oil-soluble molybdenum source based on molybdenum element is 0.005-1 parts by weight.

3. The method according to claim 1, wherein, relative to 100 parts by weight of coal powder, the amount of the solvent is 80-220 parts by weight;

and/or, the solvent is a hydrogen-donor solvent, the hydrogen-donor solvent has a $\rho^{20}$ lower than 0.98 $g \cdot cm^{-3}$, a kinematic viscosity at 40° C. lower than 5 $mm^2/s$, and a molar ratio of H to C higher than 0.25.

4. The method according to claim 1, wherein, the sulfur source is selected from at least one of elemental sulfur, inorganic sulfur and organic sulfur.

5. The method according to claim 1, wherein, the method comprises:

mixing the oil-soluble molybdenum source and the solvent first, then mixing with the coal powder, and adding the sulfur source to obtain the catalyst oil-coal slurry.

6. A catalyst oil-coal slurry, characterized in that, the catalyst oil-coal slurry comprises an oil-soluble molybdenum source, a solvent, coal powder and a sulfur source;

wherein, the oil-soluble molybdenum source is liquid molybdenum dialkyl dithiocarbamate;

the amount of the sulfur source is such that the molar ratio of sulfur element to molybdenum element in the catalyst oil-coal slurry is 2.2-2.5;

or, the catalyst oil-coal slurry is prepared by the method of claim 1.

7. The catalyst oil-coal slurry according to claim 6, wherein, relative to 100 parts by weight of coal powder, the amount of the oil-soluble molybdenum source based on molybdenum element is 0.005-1 parts by weight.

8. A method for direct coal liquefaction, characterized in that, the method comprises subjecting the catalyst oil-coal slurry of claim 6 to direct coal liquefaction;

or, subjecting coal powder to direct coal liquefaction in the presence of a solvent, an oil-soluble molybdenum source and a sulfur source, wherein, the oil-soluble molybdenum source is liquid molybdenum dialkyl dithiocarbamate;

the amount of the sulfur source is such that the molar ratio of sulfur element to molybdenum element in the catalyst oil-coal slurry is 2.2-2.5.

9. The method according to claim 8, wherein, the conditions for direct coal liquefaction include:

pressure of 18-22 MPa, temperature of 435-475° C., and time of 0.5-1.5 h.

10. The method according to claim 2, wherein, relative to 100 parts by weight of coal powder, the amount of the oil-soluble molybdenum source based on molybdenum element is 0.1-0.3 parts by weight.

11. The method according to claim 10, wherein, relative to 100 parts by weight of coal powder, the amount of the oil-soluble molybdenum source based on molybdenum element is 0.2-0.25 parts by weight.

12. The method according to claim 3, wherein, relative to 100 parts by weight of coal powder, the amount of the solvent is 100-190 parts by weight.

13. The method according to claim 12, wherein, relative to 100 parts by weight of coal powder, the amount of the solvent is 120-150 parts by weight.

14. The method according to claim 4, wherein, the sulfur source is selected from at least one of sulfur, carbon disulfide, sodium sulfide and sodium hydrosulfide.

15. The catalyst oil-coal slurry according to claim 7, wherein, relative to 100 parts by weight of coal powder, the amount of the oil-soluble molybdenum source based on molybdenum element is 0.1-0.3 parts by weight.

16. The catalyst oil-coal slurry according to claim 15, wherein, relative to 100 parts by weight of coal powder, the amount of the oil-soluble molybdenum source based on molybdenum element is 0.2-0.25 parts by weight.

* * * * *